(No Model.)
H. F. EDEY.
Plow.
No. 234,008. Patented Nov. 2, 1880.
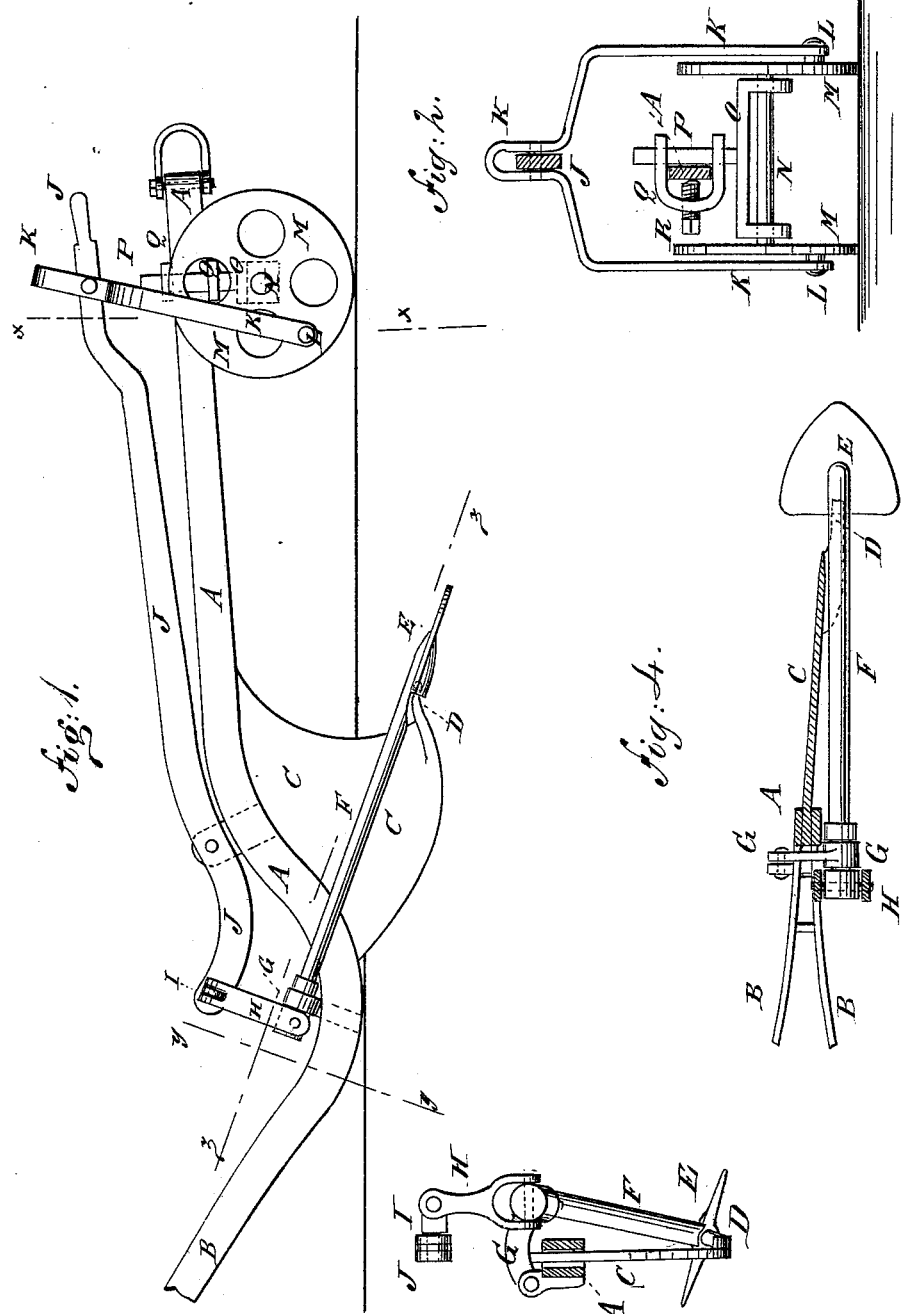

UNITED STATES PATENT OFFICE.

HENRY F. EDEY, OF BRIDGETOWN, ISLAND OF BARBADOES.

PLOW.

SPECIFICATION forming part of Letters Patent No. 234,008, dated November 2, 1880.

Application filed May 21, 1880. (No model.)

*To all whom it may concern:*

Be it known that I, HENRY F. EDEY, of Bridgetown, in the parish of St. Michael, Island of Barbadoes, have invented a new and useful Improvement in Plows, of which the following is a specification.

Figure 1 is a side elevation of the improvement. Fig. 2 is a sectional elevation taken through the line $x\ x$, Fig. 1. Fig. 3 is a sectional view taken through the line $y\ y$, Fig. 1. Fig. 4 is a sectional view taken through the line $z\ z$, Fig. 1.

The object of this invention is to furnish plows so constructed that the share or point will have a rocking movement while being drawn through the ground, to cause it to more thoroughly loosen the soil.

The invention consists in combining with the plow beam and standard a rocking rod carrying the share or point upon its lower end, and having two arms connected with its upper end, the vibrating lever, the bail, and the crank-wheels, whereby a rocking movement is given to the share or point by the vibration given to the lever by the crank-wheels, and also in the combination, with the beam and the crank-wheels, of a connecting mechanism, as will be hereinafter fully described.

Similar letters of reference indicate corresponding parts.

A represents the beam, B the handles, and C the standard, of a plow, about the construction of which parts there is nothing new. To the forward end of the foot of the standard C is attached, or upon it is formed, a pivot, D, upon which works the share or point E. To the share or point E is attached the forward end of a rod, F, to the rear part of which is attached an arm, G. The outer end of the arm G is hinged to a support attached to the beam A or handles B. To the rear end of the rod F is hinged the end of a short bar, H, the other end of which is hinged to the end of a bolt or pin, I, swiveled to the rear end of the lever J. The lever J is pivoted at a little distance from its rear end to a support attached to the rear part of the beam A. The lever J extends forward above the beam A, and its forward end is inserted in a loop or eye formed in the center of the bail K, and is pivoted to the said bail K. The ends of the bail K are pivoted to crank-pins L, attached to the wheels M, which are attached to the ends of a shaft, N. The shaft N revolves in bearings or lugs formed upon or attached to the lower side of the cross-bar O, to the center of which is attached, or upon it is formed, an upwardly-projecting arm, P. The arm P passes up at the side of the beam A, and passes through holes in the ends of a curved bar, Q, which passes around the beam A, and has a screw-hole in its center to receive the screw R. The forward end of the screw R rests against the side of the beam A, so that by turning the screw R forward the arm P will be firmly clamped against the side of the beam A, and will thus be held firmly in place.

With this construction, as the plow is drawn forward the revolution of the crank-wheels M will vibrate the lever J, the movement of which will rock the rod F, and thus give a rocking motion to the share or point E, causing the point or share to more thoroughly loosen the soil and to more easily make its way through the soil.

I have described the improvement as being applied to a standard, C; but it may be applied to any ordinary plow.

Having thus fully described my invention, I claim as new and desire to secure by Letters Patent—

1. A plow containing the following elements, viz: A beam, A, supported upon wheels M at the front end, a standard, C, at the rear end, a rocking rod, F, carrying a share or point, E, and a lever connected at one end with the wheels M, and at the other end with the rocking rod F, to give motion thereto, substantially as herein shown and described.

2. In a plow, the combination, with the beam A and the standard C, of the rocking share or point E, the rod F, provided with the arms G H, the lever J, the bail K, and the crank-wheels M, substantially as herein shown and described, whereby the share or point is made to rock, as set forth.

3. In a plow provided with a rocking share or point operated by crank-wheels, the combination, with the beam A and the wheel-shaft N, of the bearing-bar O, having arm P, the curved clamp Q, and the set-screw R, substantially as herein shown and described, for connecting the crank-wheels M with the plow-beam A, as set forth.

4. In a plow, the combination, with the lever J and the reciprocating rod F, that carries the share or point E, of the arms G H, substantially as herein shown and described, whereby a reciprocating movement is given to the rod F by the vibratory movement of the lever J, as set forth.

HENRY FARRELL EDEY.

Witnesses:
   EDMUND K. TAYLOR,
      *Solicitor, Barbadoes.*
   P. P. SPENCER,
      *Solicitor's Clerk, Barbadoes.*